(12) United States Patent
Baykal et al.

(10) Patent No.: US 8,526,443 B2
(45) Date of Patent: Sep. 3, 2013

(54) AUTOMATED VLAN ASSIGNMENT TO DOMAIN IN RING NETWORK

(75) Inventors: Berkay Baykal, Westborough, MA (US); Shaun Noel Missett, Avon, CT (US)

(73) Assignee: Calix, Inc., Petaluma, CA (US)

( * ) Notice: Subject to any disclaimer, the term of this patent is extended or adjusted under 35 U.S.C. 154(b) by 739 days.

(21) Appl. No.: 12/575,014

(22) Filed: Oct. 7, 2009

(65) Prior Publication Data
US 2011/0080915 A1     Apr. 7, 2011

(51) Int. Cl.
*H04L 12/28* (2006.01)
*H04L 12/56* (2011.01)

(52) U.S. Cl.
USPC .................................................. 370/395.53

(58) Field of Classification Search
None
See application file for complete search history.

(56) References Cited

U.S. PATENT DOCUMENTS

| | | | |
|---|---|---|---|
| 2002/0046271 A1* | 4/2002 | Huang | 709/223 |
| 2008/0131122 A1* | 6/2008 | Reisslein et al. | 398/59 |
| 2009/0016214 A1* | 1/2009 | Alluisi et al. | 370/228 |
| 2009/0067436 A1* | 3/2009 | Gast et al. | 370/395.53 |
| 2009/0268610 A1* | 10/2009 | Wu | 370/222 |

OTHER PUBLICATIONS

IEEE Standard for Local and Metropolitan Area Networks-Virtual Bridged Local Area Networks, Amendment 7: Multiple Registration Protocol, IEEE Std. 802.1ak™, Jun. 22, 2007, 107 pages.

* cited by examiner

*Primary Examiner* — Jae Y Lee
(74) *Attorney, Agent, or Firm* — Shumaker & Sieffert, P.A.

(57) ABSTRACT

In general, the disclosure describes network techniques that may automatically assign virtual local area networks (VLANs) to domains in a ring network. In one example, a method includes receiving, by a control node in a ring network, a plurality of data units transmitted by a plurality of transport nodes on the ring network, each data unit comprising profile information, and automatically assigning a VLAN to one of a plurality of domains established on the ring network based on the profile information.

48 Claims, 6 Drawing Sheets

AUTOMATED VLAN ASSIGNMENT TO DOMAIN IN RING NETWORK

TECHNICAL FIELD

The disclosure relates to computer networks and, more particularly, to ring networks.

BACKGROUND

A computer network is a collection of interconnected computing devices that can exchange data and share resources. Often, in highly populated areas, the computer network is configured in a ring formation, where certain devices, such as layer 2 devices, e.g., a switch, are interconnected via network links in a ring. That is, each layer 2 device couples via a separate network link to two adjacent layer 2 devices, one clockwise and the other counter-clockwise around the ring. It should be noted that layer 2 refers to the data link layer of the Open Systems Interconnection Reference Model (OSI Reference Model or OSI Model). When arranged in a ring, a network, e.g., an optical fiber network, a copper network, or a combination of both, is referred to as a "ring network."

Generally, access nodes, subtending from a layer 2 device, provide access to the ring network. Access nodes, such as a Digital Line Subscriber Line Access Multiplexer (DSLAM), a Cable Modem Termination System (CMTS), and a Passive Optical Network (PON) optical line terminal (OLT), for example, each manage access by one or more of the computing devices to the ring network. The access node may, for example, multiplex (or "aggregate") traffic from computing devices into a composite signal and transmit this signal to a switch on the ring network for delivery to one or more destinations.

The computing devices couple to the access nodes to gain access to the ring network and thereby interconnect with other computing devices coupled to the ring network via access nodes. The computing devices generate data traffic and exchange this data traffic with other computing devices via the interconnection provided by the ring network. The layer 2 devices forward the data traffic typically in a determined direction, e.g., clockwise or counter-clockwise, around the ring to facilitate the exchange. The ring network may provide generous geographical coverage due to its topology, which allows the ring network to reach computing devices dispersed over wide geographical areas. The ring network may be resilient in that it can forward data in both the clockwise and counter-clockwise directions to avoid a faulted link.

SUMMARY

In general, the disclosure describes network techniques that may automatically assign virtual local area networks (VLANs) to existing domains in a ring network. Layer 2 networks depend on VLANs to create a transport path between an access node, which provides access to a ring network comprised of transport and control nodes, and one or more layer 3 routers, which provide access to one or more layer 3 networks.

If supported by the ring topology protocol used by the ring network, the ring network may be divided into multiple loop-free domains, and traffic may be partitioned between these domains. One criterion when partitioning traffic to domains is to utilize the VLAN space where a subset of VLANs is assigned to a domain. However, assigning a VLAN to a domain is a manual process that is prone to error.

Using the techniques described in this disclosure, VLANs may be automatically assigned to domains on the ring network. In some implementations, VLANs may be dynamically assigned based on heuristics supported by the system and the information contained about the traffic profile of the VLAN by an originating node of the VLAN.

In one example, the disclosure is directed to a method comprising receiving, by a control node in a ring network, a plurality of data units transmitted by a plurality of transport nodes on the ring network, each data unit comprising profile information, and automatically assigning a virtual local area network (VLAN) to one of a plurality of domains established on the ring network based on the profile information.

In another example, the disclosure is directed to a network device comprising a processor configured to receive a plurality of data units transmitted by a plurality of transport nodes on the ring network, each data unit comprising profile information, and automatically assign a virtual local area network (VLAN) to one of a plurality of domains established on the ring network based on the profile information.

In yet another example, the disclosure is directed to a computer-readable medium comprising instructions encoded on the computer-readable medium that, upon execution, cause a processor within a network device to receive a plurality of data units transmitted by a plurality of transport nodes on the ring network, each data unit comprising profile information, and automatically assign a virtual local area network (VLAN) to one of a plurality of domains established on the ring network based on the profile information.

In yet another example, the disclosure is directed to a network device comprising means for receiving, by a control node in a ring network, a plurality of data units transmitted by a plurality of transport nodes on the ring network, each data unit comprising profile information, and means for automatically assigning a virtual local area network (VLAN) to one of a plurality of domains established on the ring network based on the profile information.

The details of one or more aspects of this disclosure are set forth in the accompanying drawings and the description below. Other features, objects, and advantages will be apparent from the description and drawings, and from the claims.

DETAILED DESCRIPTION

Ring topologies, e.g., Ethernet ring topologies, are commonly used in networks as they require less optical fiber or copper for connectivity and provide an effective topology for creating a loop-free layer 2 network with good convergence times. A ring network may be partitioned into multiple domains. A domain is essentially a path that traffic may take from an originating point to a terminating point. A virtual local area network, or VLAN, is a group of hosts with a common set of requirements that communicate as if they were connected to the broadcast domain, regardless of their physical location. VLANs, which provide the transport path between routers and access nodes for subscriber and/or service traffic, may be assigned to these domains. However, assigning a VLAN to a domain is a manual procedure that is prone to error by an operator. And, factors such as latency and load balancing should be taken into account by the operator in making the assignment. In general, the disclosure is directed to network techniques that may automatically assign virtual local area networks (VLANs) to existing domains in a ring network.

Figure 1:
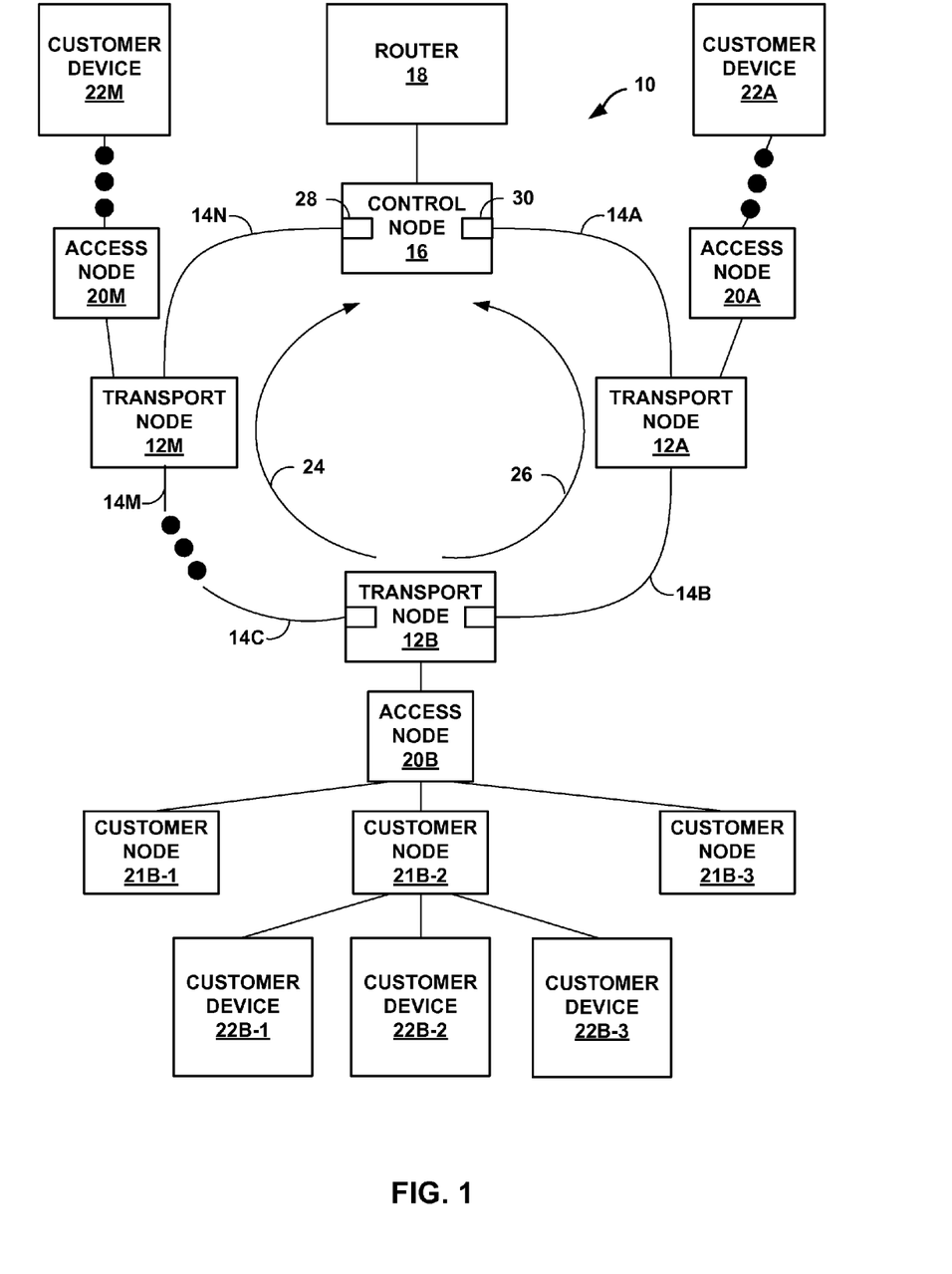
FIG. 1 is a block diagram illustrating an example ring network configured to automatically assign a virtual local area network (VLAN) to a domain in a ring network using the techniques described in this disclosure.

FIG. 1 is a block diagram illustrating an example ring network configured to automatically assign a virtual local area network (VLAN) to a domain in a ring network using the techniques described in this disclosure. As shown in FIG. 1, ring network 10 includes transport nodes 12A-12$m$ ("transport nodes 12"), links 14A-14N ("links 14"), a control node 16, router 18, access nodes 20A-20M ("access nodes 20"), customer nodes 21A-21M ("customer nodes 21"), and customer devices 22A-22M ("customer devices 22"). Transport nodes 12 and control node 16 are coupled via respective links 14 to form a ring topology. For example, control node 16 is coupled to transport node 12A via link 14A, transport node 12A is coupled to transport node 12B via link 14B, and so on, completing the ring with transport node 12M coupled to control node 16 via link 14N. Each transport node 12 may be coupled to an access node 20. Each access node 20 may be coupled to one or more customer nodes 21, which in turn may be coupled to one or more customer devices 22. Access nodes, e.g., Digital Line Subscriber Line Access Multiplexer (DSLAM), a Cable Modem Termination System (CMTS), a Passive Optical Network (PON) Optical Line Terminal (OLT), or other broadband service transport and/or aggregation elements, each manage access by one or more of the computing devices to the ring network. Router 18, a layer 3 device, provides access to a layer 3 network (not shown), e.g., the Internet. Additional examples of transport and/or aggregation elements include the Calix C7 Multiservice Access Platform and the Calix E5 Multiservice Ethernet Service Platform, commercially available from Calix Networks, Inc., of Petaluma, Calif.

Customer nodes 21 may comprise one of many devices used to connect a customer device, e.g., customer device 22, to a network, e.g., ring network 10 and the Internet. Customer node 21 may include, but is not limited to, a cable modem, a digital subscriber line (DSL) modem, and/or an optical network terminal (ONT). Numerous customer nodes 21 may subtend from an access node. For example, in FIG. 1, three customer nodes, namely customer nodes 21B-1, 21B-2, and 21B-3 are shown subtending from access node 20B. While three customer nodes are depicted subtending from access node 20B, there may be more, or fewer, customer nodes 21B in a given implementation.

Subtending from each customer node 21 is one or more customer devices 22. Customer devices 22 may comprise a wide variety of computing devices, such as one or more of a personal digital assistant (PDA), a workstation, a personal computer, a laptop computer, a television set-top box, a voice-over-internet protocol (VoIP) telephone, or any other computing device capable of generating and/or receiving traffic via ring network 10 and access node 20. That is, customer devices 22 may comprise any computing device capable of receiving from and forwarding traffic to a pertinent access node 20. Customer devices 22 may implement network protocols, such as a transmission control protocol (TCP)/internet protocol (IP), to exchange traffic to and from access nodes 20. The traffic may include information supporting voice, data and/or voice services for any of a variety of client computing devices. It should be noted that each access node may be coupled to multiple customer devices 22. In addition, a single transport node 12 may be coupled to multiple access nodes 20 (not shown).

As seen in FIG. 1, numerous customer devices 22 may subtend from a single customer node 21. For example, in FIG. 1, three customer devices, namely customer devices 22B-1, 22B-2, and 22B-3, are shown subtending from customer node 21B-2. While three customer devices are depicted subtending from customer node 21B-2, there may be more, or fewer, customer devices 22 in a given implementation. Customer devices 22, as described above, may include various client computing devices configured to support a variety of services such as voice, video and data services.

Exemplary ring network 10 may be configured to provide a wide area network (WAN) or a metropolitan area network (MAN). Ring network 10, because it services two or more customer devices 22, may be referred to as a "backbone" network, in that ring network 10 provides a backbone to support the exchange of traffic between customer devices 22. Typically, to support the high level of data traffic often found on backbone networks, links 14 may comprise optical fiber links to facilitate the rapid transfer of the traffic around ring network 10.

Transport nodes 12, e.g., a layer 2 device such as a layer 2 switch, receive and forward traffic from customer devices 22, via access nodes 20, over ring network 10. Both an access node 20 and router 18 may be referred to as an "originating point" in that an access node "originates" traffic on ring network 10. Although each access node 20 is shown subtending from a transport node 12, this is a logical division and the access node may reside in the transport node. In other words, access node 20 and transport node 12 may reside in the same location and, in some cases, in the same hardware unit or chassis. Control node 16 may be referred to as a "terminating point" in that the control node "terminates" traffic on ring network 10. Each of transport nodes 12 also forwards traffic received from other transport nodes 12 and control node 16 via ring network 10 to respective customer devices 22.

The ring topology of ring network 10 may offer generous geographic coverage and resilience. That is, ring network 10 may reach customer devices 22 dispersed over wide geographic areas, such as a metropolitan area. Ring network 10 typically provides resilience because traffic may be forwarded in a clockwise or counter-clockwise direction around ring network 10. By enabling both directions of forwarding, network devices 12 may forward traffic so as to avoid one of links 14 that has failed, while still reaching every one of the transport nodes 12 and control node 16. In particular, upon detecting a fault in link 14A, for example, control node 16 may forward traffic via link 14N counter-clockwise around ring network 10 to reach transport node 12A. Transport node 12A may, to avoid faulted link 14A, simultaneously forward traffic via link 14B clockwise around ring network 10 to reach control node 16. Ring network 10 therefore supports simultaneous forwarding of traffic in both the clockwise and counter-clockwise directions to avoid the faulted link. Consequently, ring network 10 may not only provide generous geographical coverage but resilience as well. Layer 2 access networks are commonly built using ring topologies to conserve copper or optical fiber and provide an effective topology for network resilience and convergence after a failure.

While providing wide geographical coverage and reasonable resilience, the ring network may suffer from traffic loops. For certain types of data that do not include a specific destination, such as multicast or broadcast data, for example, each of the transport nodes 12 may simply forward this data around the ring to ensure each transport node 12 forwards the data to every computing device. If none of transport nodes 12 identify that this data is looping the ring network, each transport node 12 may continue to forward the traffic endlessly, thereby establishing a traffic loop, which may substantially impact the performance of the ring network by needlessly consuming network resources, such as switch processing time and memory as well as link bandwidth.

In order to correct for traffic loops, a master device, e.g., control node 16, may be configured using one of many ring topology protocols, e.g., IEEE 802.17 Resilient Packet Ring Protocol, Rapid Ring Protection Protocol, Resilient Ethernet Protocol, and RFC-3619, to block traffic in one direction via one of its ports. Control node 16 may include primary port 28 and secondary port 30. Control node 16 forwards traffic via primary port 28 and blocks traffic via secondary port 30. Typically, control node 16 blocks secondary port 30 logically. In other words, control node 16 may actively filter traffic arriving via secondary port 30, discarding or dropping certain traffic, such as data traffic, but allowing other traffic, such as control traffic used by control node 16 to monitor or otherwise control ring network 10. By blocking traffic arriving via secondary port 30 in this manner, control node 16 ensures that data traffic does not continually loop through the ring network, while preserving the beneficial aspects of wide geographical coverage and resilience associated with the ring network.

As mentioned above, ring network 10 may be divided into multiple domains, as seen in FIG. 1. A first domain ("domain 24") is depicted as a clockwise path around ring network 10, and a second domain ("domain 26") is depicted as a counter-clockwise path around ring network 10. A domain is essentially a loop free path within a ring topology that traffic may take from an originating point on ring network 10 to a terminating point on ring network 10. VLANs, which provide the logical transport path that corresponds to an actual physical transport path between routers and access nodes for subscriber and/or service traffic, may be assigned to these domains. For example, four VLANs (not shown) may originate at transport node 12B and may be distributed between the two domains, namely domains 24 and 26, equally. That is, two of the four VLANs may be assigned to domain 24 and the remaining two VLANs may be assigned to domain 26.

For example, assume that the four VLANs (not shown) originating at transport node 12B were designated as A, B, C, and D. VLANs A, B, C, and D may, for example, be used by separate departments within the same company to organize each department's respective users. VLANs A and B may be assigned to clockwise domain 24, and VLANs C and D may be assigned to counter-clockwise domain 26. Under normal operating conditions, control node 16 may block secondary port 30 for VLANs A and B, thereby preventing traffic from VLANs A and B from looping ring network 10. Similarly, under normal operating conditions, control node 16 may block primary port 28 for VLANs C and D, thereby preventing traffic from VLANs C and D from looping ring network 10. In this manner, control node 16 forms ring network 10 for the four different VLANs, and forces these VLANs to traverse the ring in a desired direction.

If one of the nodes 12A-12C, 16 or an interface on one of the nodes, on the ring fails, the topology adjusts and at least one of the domains traversing the ring in one direction may switch its path to go around the failure. In this manner, control node 16 and transport nodes 12 create a loop-free topology around ring network 10 to transport data units, e.g., Ethernet packets, from access nodes 20 toward layer 3 router 18. This methodology allows more efficient use of the bandwidth of ring network 10 because the traffic is balanced in both directions around the ring. Ring topologies that do not provide VLAN dimensioning only support one path around the ring for all VLANs, thus resulting in unidirectional use of the available bandwidth. In other words, ring topology protocols usually resolve the topology at the physical interface level, which yields a single domain around the ring.

Layer 2 networks depend on VLANs to provide the transport path between the layer 3 router 18 and an access node 20. Each VLAN is defined on all nodes, e.g., transport nodes 12 and control node 16 that participate in carrying that VLAN's traffic. The origination point, e.g., router 18 or access node 20, and the terminating point, e.g., access node 20 or router 18, typically need to be manually configured for the VLAN. That is, an operator must manually associate a physical interface on both the originating point and the terminating point with the specified VLAN.

The provisioning of VLANs on all nodes along a path can be an error prone and tedious process. VLAN registration protocols such as Generic Attribute Registration Protocol (GARP) VLAN Registration Protocol (GVRP) are standardized and commonly used in enterprise and carrier networks. VLAN registration protocols such as GVRP automate the provisioning of VLANs on intermediate node by announcing the availability of VLANs for interested parties. Using GVRP, for example, a layer 2 device on which a VLAN has been manually created and defined by an operator, e.g., a layer 2 switch, transmits a GVRP announcement, e.g., a GVRP data unit, announcing all VLANs configured on the layer 2 switch. If GVRP is enabled on the intermediate node, the intermediate node will learn the attributes of the VLAN, e.g., the VLAN ID and the ports on the layer 2 device on which the VLAN is configured, via the GVRP data unit and will be dynamically configured to be a member of the advertised VLAN.

Referring again to FIG. 1, any VLAN configured on ring network 10 must be associated with both primary and secondary interfaces around the ring in order to accommodate traffic flow in either direction (in case the topology adjusts and at least one of the domains 24, 26 traversing the ring in one direction switches its path to go around a failure). As mentioned above, control node 16 blocks the VLANs on one of its interfaces 28, 30 to ensure that a loop-free layer 2 topology exists on the ring.

Using existing ring topology protocols, all the nodes around the ring, over time, learn the topology of the ring network and only forward the traffic in one direction for a particular VLAN. During startup, however, when the layer 2 bridge tables are not populated, traffic is flooded on both directions.

An operator may manually assign a VLAN to a domain. However, assigning a VLAN to a domain can be a time consuming and error prone process. Some ring networks, for example, may have thirty-two transport nodes on the ring and several hundred VLANs. Manually assigning these VLANs on each transport node can be quite a burden for the operator.

Techniques are described in this disclosure that provide a VLAN registration method to be used with ring networks in which a VLAN may be dynamically assigned, without manual intervention by an operator, based on heuristics supported by the devices of the ring network and the information contained about the traffic profile of the VLAN by the originating point, to existing domains on the ring network. VLAN registration is a process through which the interface and VLAN association is dynamically learned through a network. VLAN assignment refers to associating a VLAN with a domain defined over a ring topology. As a by-product of VLAN assignment, a VLAN is registered by nodes participating in the domain. The techniques propose extensions to existing VLAN registration protocols and ring topology protocols, thereby allowing the ring network, or a processor associated with a particular node on the network, to assign VLANs dynamically-learned via VLAN registration protocols, e.g., GVRP, to topologies created around the ring network. The techniques make no assumptions regarding the protocols utilized for building and maintaining the ring network other than that the ring topology protocol creates multiple loop-free domains around the ring network to which VLANs may be assigned.

In accordance with one technique that may be employed to dynamically assign a VLAN to an existing domain on a ring network, a VLAN registration protocol, e.g., GVRP, may be enhanced, or extended, to include traffic profile information. A VLAN traffic profile may include the following non-limiting list of information: a bandwidth of the VLAN, e.g., expected average bandwidth; the traffic class of the VLAN, e.g., expedited forwarding, assured forwarding, best effort; the forwarding behavior of the VLAN, e.g., learning desired or not desired; and the preferred ring domain of the VLAN, if specified. Including traffic profile information in a VLAN registration protocol may enable control node 16 to make effective decisions in assigning a VLAN to an existing domain on the ring network.

For example, assume for purposes of illustration that control node 16 is configured such that two VLANs, VLAN A and VLAN B (not shown), are allocated on domain 24 and one VLAN, VLAN C (not shown) is allocated on domain 26 of ring network 10 of FIG. 1. Further assume that VLAN A has an average bandwidth of 10 megabits per second (Mbps), VLAN B has an average bandwidth of 10 Mbps, and VLAN C has an average bandwidth of 10 Mbps. If a fourth VLAN, VLAN D, is to be added to ring network 10, and VLAN D has an average expected bandwidth of 10 Mbps, control node 16 must determine to which domain it will allocate VLAN D. The natural choice is for control node 16 to allocate VLAN D on domain 26 so that the two domains 24, 26, and thus ring network 10, are load balanced (because the traffic is equally divided between the two domains). A VLAN registration protocol may be extended such that the data units transmitted according to the VLAN registration protocol include fields that may include, for example, a bandwidth of the VLAN. That is, a processor or control unit is configured to apply an extension of the VLAN registration protocol. Thus, in the example above, control node 16 may receive, via an extended VLAN registration protocol data unit, information defining the bandwidth of VLAN D, e.g., 10 Mbps, that may be used by control node 16 in determining to which domain VLAN D will be allocated.

In another example, a VLAN registration protocol may be extended such that the data units transmitted by the protocol include fields that may include, for example, a preferred ring domain for that VLAN. If the preferred ring domain is specified, control node 16 may assign the VLAN based on the VLAN's declared interest in the domain.

For example, assume for purposes of illustration that control node 16 is configured such that one VLAN, VLAN A (not shown), is allocated on domain 24 and that no VLANs are currently allocated on domain 26 of ring network 10 of FIG. 1. If a second VLAN, VLAN B, is to be added to ring network 10, control node 16 must determine to which domain it will allocate or assign VLAN B. The natural choice may be for control node 16 to allocate VLAN B to domain 26 so that traffic is divided between the two domains 24, 26 of ring network 10. However, a VLAN registration protocol may be extended such that the data units transmitted by the protocol include fields that may include, for example, a preferred ring domain of the VLAN. In the example above, control node 16 may receive, via a VLAN registration protocol data unit, information defining the preferred ring domain of VLAN B. The preferred ring domain of VLAN B may, for example, be domain 24, along with VLAN A, rather than domain 26. Thus, control node 16 may allocate a VLAN to a domain based on the VLAN's declared interest in a domain.

In another example, a VLAN registration protocol may be extended such that the data units transmitted by the protocol include fields that may include, for example, the forwarding behavior, e.g., learning of media access control (MAC) addresses desired or not desired, of the VLAN. The data units may identify to the control node, e.g., control node 16, whether the VLAN advertised requires the layer 2 transport nodes 12 to learn the MAC addresses on each of its ports or not. The forwarding behavior of the layer 2 devices may impact the bandwidth accounting for the ring network. For example, if learning is not utilized, the VLAN will always consume bandwidth on two directions around the ring because the layer 2 device must forward data units out ports in both directions.

Using the techniques of this disclosure, control node 16 may announce the creation of, or modification to, the VLAN over ring network 10 using the VLAN registration protocol. If any access nodes seek to join the VLAN, those access nodes transmit a data unit back to control node 16 that indicates their interest in joining Upon receiving data units that indicate an interest in joining the advertised VLAN, control node 16 must decide which domain will carry the VLAN. After using one or more heuristics described in this disclosure, e.g., heuristics such as load balancing, latency, and the declared interest of a VLAN in a domain, control node 16 may assign the VLAN to a domain and then transmit the domain information to transport nodes 12 via the VLAN registration protocol. In such a manner, control node 16 may automatically assign a virtual local area network (VLAN) to one of a plurality of domains established on the ring network based on the profile information.

In accordance with another technique that may be employed to dynamically assign a VLAN to an existing domain on a ring network, a ring topology protocol, e.g., Resilient Packet Ring, may be enhanced, or extended, so that control node 16 may keep track of the distance, in number of hops, i.e., the number of devices that must forward a data unit in order to reach the control unit, between each transport node 12 and control node 16. Thus, a VLAN belonging to a pre-defined traffic class, e.g., expedited forwarding, assured forwarding, or best effort, may be assigned by control node 16 to a domain on ring network 10 based on the number of hops to control node 16. If, for example, both domains share the same number of hops, control node 16 may use other heuristics to assign the VLAN to a domain.

For example, assume for purposes of illustration that no VLANs are currently allocated on either domain 24 or domain 26 in ring network 10 in FIG. 1. If a first VLAN, VLAN A (not shown) is to be added to ring network 10, control node 16 must determine to which domain it will allocate VLAN A. As described above, a VLAN registration protocol may be extended such that the data units transmitted by the protocol include fields that may include, for example, a traffic class of the VLAN. For purposes of illustration, assume that the forwarding class of VLAN A has been specified as expedited forwarding. In addition, as described above, a ring topology protocol may be extended so that control node 16 may keep track of the number of hops between each transport node 12 and control node 16. As seen in FIG. 1, there are two hops between transport node 12B and control node 16 on domain 26, the counter-clockwise domain. Assume that in FIG. 1, there are more than two hops between transport node 12B and control node 16 on domain 24, the clockwise domain. Upon receiving the traffic profile information of VLAN A, in particular its expedited forwarding traffic class, control node 16 may allocate VLAN A to domain 26 because there are fewer hops. As such, control node 16 may assign a VLAN to a domain in light of potential latency concerns.

Thus, using the techniques of this disclosure, VLANs may be partitioned to domains of a ring network using one or more heuristics such as load balancing, latency, and the declared interest of a VLAN in a domain. Some VLANs may be statically allocated to a domain based on their profile, while others may be forced to a domain to ensure a balanced ring, as well as optimization for a VLAN that may require minimizing possible latency.

Figure 2:
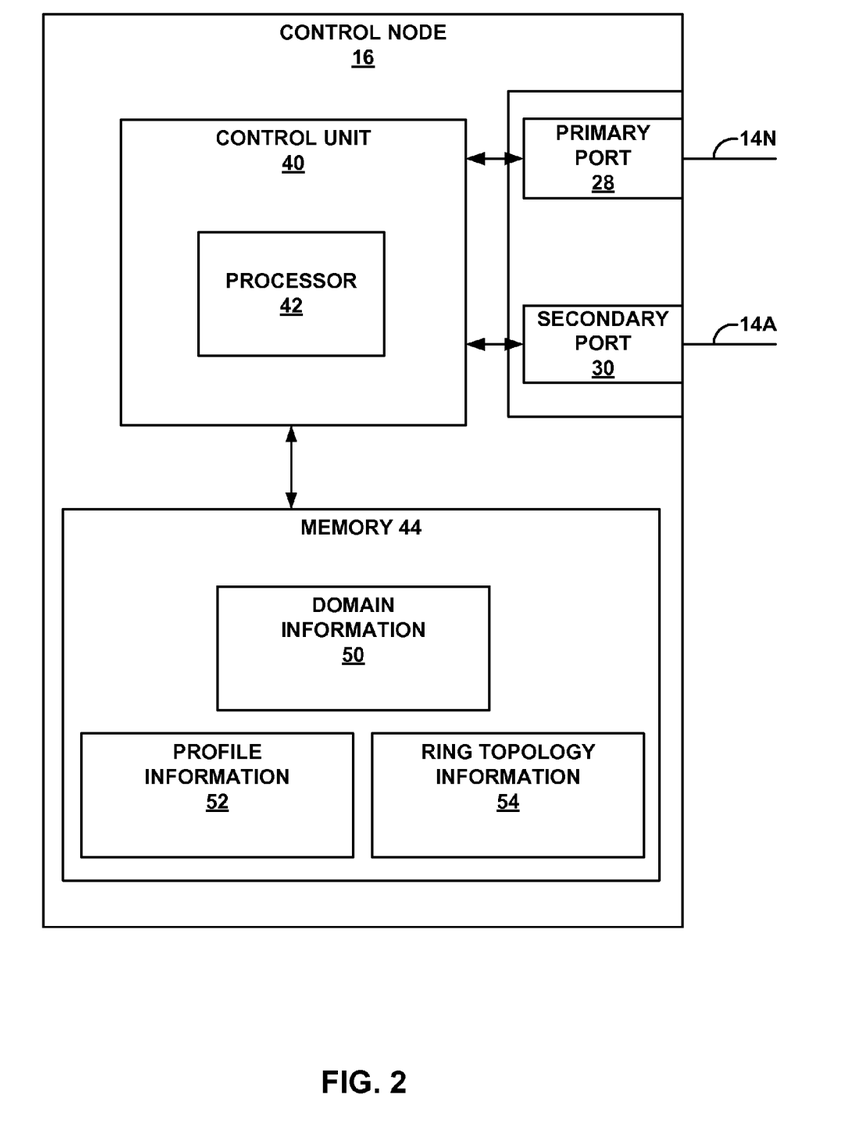
FIG. 2 is a block diagram illustrating an example of a control node that may implement the techniques described in this disclosure.

FIG. 2 is a block diagram illustrating, in more detail, an example of control node 16 shown in FIG. 1 that implements the techniques described in this disclosure. As shown in FIG. 2, control node 16 includes an interface module 36. Interface module 36 represents a module for interfacing with each of links 14A, 14N. Interface module 36 includes a primary port 28 and a secondary port 30, where primary port 28 interfaces with link 14N and secondary port 30 interfaces with link 14A. Primary port 28 and secondary port 30 are illustrated in this manner merely for exemplary purposes and represent logical designations. That is, currently designated secondary port 30 may be re-designated as a primary port 28 and primary port 28 may also be re-designated as secondary port 30. Interface module 36 may represent hardware, software, or a combination of both to implement the techniques described in this disclosure.

Although not shown for ease of illustration purposes, interface module 36 may comprise additional ports for receiving additional links. For example, one or more of these additional ports may interface with the additional links to couple control node 16 to router 18.

Control node 16 also includes a control unit 40 that couples to interface module 36 and, in particular, primary port 28 and secondary port 30. Control unit 40 may comprise one or more processors 42, such as microprocessors, digital signal processors (DSPs), or microcontrollers, that execute software instructions, such as those used to define a software or computer program, stored in a computer-readable storage medium such as memory 44 (e.g., a Flash memory, random access memory (RAM), or any other type of volatile or non-volatile memory that stores instructions), or a storage device (e.g., a disk drive, or an optical drive). Alternatively, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Control node 16 may further store in memory 44 data that represents information defining the domains on the ring network, information that defines the profile of each VLAN on the ring network, and information that defines the ring topology. For example, domain identifiers may be stored as domain information 50. VLAN profile information such as a bandwidth of the VLAN, the traffic class of the VLAN, the forwarding behavior of the VLAN, and the preferred ring domain of the VLAN may be stored in profile information 52. Ring topology information, including identifiers of transport nodes 12 on ring network 10 and their respective distances in number of hops from control node 16 may be stored in ring topology information 54.

As described above, control unit 40 may be configured or programmed to apply an extended VLAN registration protocol. For example, a VLAN registration protocol may be extended such that the data units transmitted by transport node 12 using the protocol include fields that may include, for example, VLAN profile information. Control node 16 receives such a transmitted data unit on interface module 36. Control unit 40, and in particular processor 42, removes information such as a header and trailer by decapsulating the data and assigns, without manual intervention, a VLAN to one of the domains established on ring network 10 based on the profile information. In some examples, control node 16 stores the VLAN profile information in profile information 52.

Similarly, as indicated above, a ring topology protocol may be extended so that control node 16 may determine a distance, in number of hops, from each transport node 12 to control node 16. In addition to the data path used by transport nodes 12 to transport data packets around the ring, ring network 10 also includes a control path (not shown). The control path is used by control node 16 to transmit control data units around ring network 10 to transport nodes 12. These control data units may be used by control node 16 to communicate with each transport node 12, e.g., to determine the health of ring network 10.

In accordance with techniques of this disclosure, these control data units may be extended such that each transport node 12 may add topology information to the control data unit as the control data unit traverses ring network 10. In such a manner, control node 16 may construct a topology of the ring network, and thus the number of hops between each transport node 12 and control node 16. For instance, each transport node 12, via a learning option, may learn the identity of its two immediate neighbors, i.e., its east and west neighbors. In one example, each of the plurality of transport nodes 12 of ring network 10 comprises an identifier that is at least unique with respect to the identifiers of the other transport nodes within the ring network, e.g., a media access control (MAC) address, a string name, or the like. Upon receiving a control data unit via a protocol such as Link Layer Discovery Protocol (LLDP), each transport node 12 may add topology information to the data unit and forward the data unit to the neighboring transport node.

In some examples, each transport node 12 on ring network 10 may modify the control data unit to include the unique identifier of the transport node. In this manner, hop by hop, a complete topology of ring network 10 is created within the control data unit. Upon receiving the modified control data unit on interface module 36, control node 16 decapsulates the data unit and determines the distance, in number of hops, from each transport node 12 to control node 16 based on the modified control data unit. In some examples, control node 16 stores the topology information in ring topology information 54 of memory 44. Control node 16 may then assign, without manual intervention, a VLAN to one of the domains established on ring network 10 based on the profile information by comparing the profile information to the distance, in number of hops, from each transport node to the control node and assigning the VLAN to one of the plurality of domains established on the ring network based on the comparison.

In one example, control node 16 may compare the traffic class of the VLAN, e.g., expedited forwarding, assured forwarding, best effort, to the distance, in number of hops, from the transport node to the control node and assign the VLAN to the domain having the fewest number of hops, for the traffic class of the VLAN. For example, assume that the forwarding class of a VLAN has been specified as expedited forwarding, that there are two hops between transport node 12B and control node 16 on domain 26, the counter-clockwise domain, and that there are more than two hops between transport node 12B and control node 16 on domain 24, the clockwise domain. Control node 16 compares the traffic profile information of the VLAN, in particular its expedited forwarding traffic class, to the number of hops for each domain and allocates the VLAN to domain 26 because there are fewer hops. As such, control node 16 may assign a VLAN to a domain in light of potential latency concerns.

In another example, control node 16 may compare the expected bandwidth of a VLAN to an available bandwidth of each of the plurality of domains established on ring network 10 and assign the VLAN to a domain based on the comparison. In this manner, the domains on the ring network may be load balanced. For example, assume for purposes of illustration that control node 16 is configured such that two VLANs, VLAN A and VLAN B (not shown), are allocated on domain 24 and one VLAN, VLAN C (not shown) is allocated on domain 26 of ring network 10 of FIG. 1. Further assume that VLAN A has an average bandwidth of 10 megabits per second (Mbps), VLAN B has an average bandwidth of 10 Mbps, and VLAN C has an average bandwidth of 10 Mbps. If a fourth VLAN, VLAN D, is to be added to ring network 10, and VLAN D has an average expected bandwidth of 10 Mbps, control node 16 must determine to which domain it will allocate VLAN D. Control node 16 may automatically assign, i.e., without manual intervention, VLAN D to one of the plurality of domains established on ring network 10 based on the profile information by comparing the expected bandwidth of VLAN D, e.g., 10 Mbps, to an available bandwidth or to a utilized bandwidth of each of the plurality of domains established on the ring network, e.g., domain 24 is using 20 Mbps while domain 26 is using 10 Mbps. Then, control node 16 may assign the VLAN to the domain based on load balancing criteria, e.g., whether the loads on the two domains are approximately equal or within a certain percentage difference. In the above example, the load on ring network 10 may be balanced by assigning VLAN D to a domain based on the comparison, e.g., by assigning VLAN D to domain 26. In this manner, both domain 24 and domain 26 have utilized bandwidths of 20 Mbps.

In another example, control node 16 may assign, without manual intervention, a VLAN to one of a plurality of domains established on ring network 10 by assigning the VLAN to the preferred ring domain specified within the data unit transmitted by transport node 12 to control node 16. It should be noted that, in some examples, control node 16 may contain a table that includes the VLANs assigned to each domain. Also, when blocking a secondary interface, control node 16 may block traffic on a per VLAN basis.

In another example, control node 16 may assign, without manual intervention, a VLAN to one of a plurality of domains established on ring network 10 such that the VLANs are distributed to create an equal number of VLANs in each domain. For example, assume for purposes of illustration that control node 16 is configured such that two VLANs, VLAN A and VLAN B (not shown), are allocated on domain 24 and one VLAN, VLAN C (not shown) is allocated on domain 26 of ring network 10 of FIG. 1. If a fourth VLAN, VLAN D, is to be added to ring network 10, control node 16 may assign VLAN D to domain 26 in order to balance the number of VLANs on domain 24 with the number of VLANs on domain 26. After assigning VLAN D to domain 26, both domain 24 and domain 26 have been assigned two VLANs.

Thus, using the techniques of this disclosure, VLANs may be automatically allocated to domains of a ring network using heuristics such as load balancing, latency, and the declared interest of a VLAN in a domain. These heuristics may be used alone or in combination.

By way of a non-limiting specific example of these heuristics being used in combination, assume for purposes of illustration that control node 16 is configured such that two VLANs, VLAN A and VLAN B (not shown), are allocated on domain 26 and one VLAN, VLAN C (not shown) is allocated on domain 24 of ring network 10 of FIG. 1. Further assume that VLAN A has an average bandwidth of 10 megabits per second (Mbps), VLAN B has an average bandwidth of 10 Mbps, and VLAN C has an average bandwidth of 10 Mbps. If a fourth VLAN, VLAN D, is to be added to ring network 10, and VLAN D has an average expected bandwidth of 10 Mbps, control node 16 must determine to which domain it will allocate VLAN D.

However, further assume that the traffic class of VLAN D has been specified as expedited forwarding, that there are two hops between transport node 12B and control node 16 on domain 26, the counter-clockwise domain, and that there are more than two hops between transport node 12B and control node 16 on domain 24, the clockwise domain.

Control node 16 may use multiple heuristics in combination, in this case load balancing and latency, in order to determine how to automatically assign VLAN D to one of the domains on ring network 10. Control node 16 may, for example, compare in a first comparison, the traffic class of the VLAN to the distance, in number of hops, from each transport node to the control node. For example, an expedited forwarding class requires that latency be reduced as much as possible, thereby requiring that the fewest number of hops be used to forward a data unit. Then, control node 16 may, for example, compare in a second comparison, the expected bandwidth of the VLAN to an available bandwidth or utilized bandwidth of each of the domains established on ring network 10. Based on the first comparison and the second comparison, control node 16 may assign VLAN D to one of the domains established on ring network 10. For example, based on a comparison between the distance in hops and the traffic class of VLAN D, control node 16 may assign VLAN D to domain 26. In particular, VLAN D may have assured forwarding as its traffic class and, because there are fewer hops between transport node XX and control node on domain 26, control node 16 may assign VLAN D to domain 26. But, based on a comparison between the expected bandwidth of VLAN D and the utilized or available bandwidth of each of the domains, control node 16 may be assigned to domain 24. In one example, latency concerns may take priority over load balancing concerns. As such, VLAN D may be assigned to domain 26. In other examples, load balancing concerns may take priority over latency concerns. As such, VLAN D may be assigned to domain 24.

It should be noted that latency and load balancing is only one example of a combination of heuristics used by a control node to automatically assign, i.e., without manual intervention, a VLAN to one of a plurality of domains established on the ring network based on the profile information of the VLAN. Again, profile information of the VLAN may include an expected bandwidth of the VLAN, a traffic class of the VLAN, a forwarding behavior of the VLAN, and a preferred ring domain of the VLAN. Although only one example combination was described for simplicity, numerous other combinations of heuristics such as load balancing, latency, and the declared interest of a VLAN in a domain are possible and are considered to form part of this disclosure.

In accordance with another technique that may be employed to dynamically assign a VLAN to an existing domain on a ring network, an access node 20 may automate the generation of VLAN traffic profiles. Each access node 20 is provisioned with a service configuration for each customer using a customer device 22. For example, an access node 20 may be configured to provide a particular customer with specific upload and download data transfer rates, as well as specific traffic class, e.g., expedited forwarding. As such, the bandwidth consumption of a VLAN that includes that customer may be driven by the service configuration on the access node that provides the customer access to ring network 10. Thus, the VLAN-to-subscriber port assignment may indicate both the bandwidth traffic profile parameter and the traffic class, for example. The forwarding behavior of a VLAN may be determined when the operator creates the VLAN, and the preferred ring domain may be added via a configuration option when the VLAN is configured on the access node.

Figure 3:
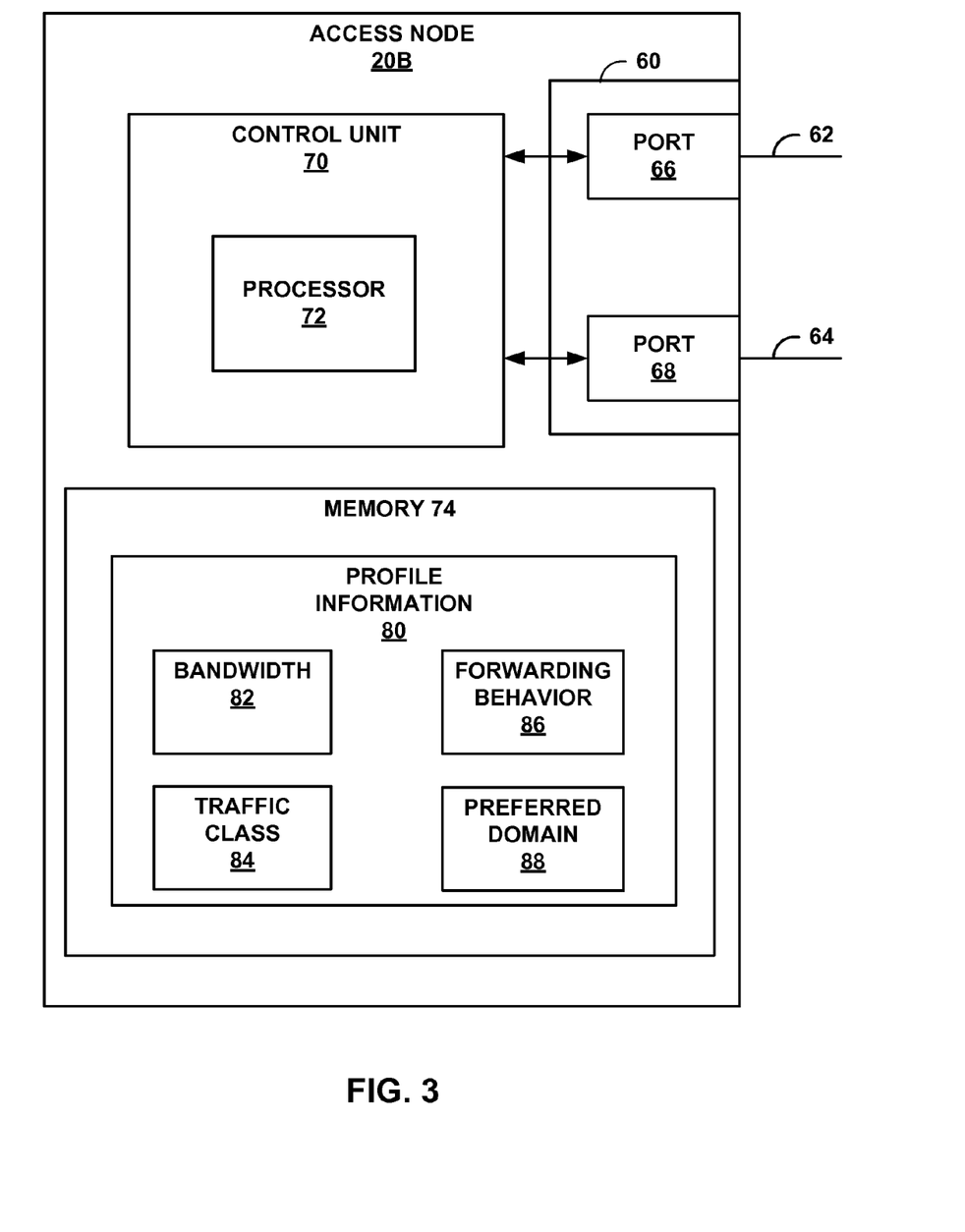
FIG. 3 is a block diagram illustrating an example of an access node that may implement the techniques described in this disclosure.

FIG. 3 is a block diagram illustrating, in more detail, an example of access node 20B shown in FIG. 1 that implements the techniques described in this disclosure. While the techniques are described below with respect to one of access nodes 20 of FIG. 1, each of access nodes 20 may comprise similar components to those described below with regards to access node 20B. The techniques are described with respect to access node 20B for ease of illustration purposes.

Access node 20B may be, for example, a Digital Line Subscriber Line Access Multiplexer (DSLAM), a Cable Modem Termination System (CMTS), a Passive Optical Network (PON) Optical Line Terminal (OLT), or similar layer 2 device that aggregates traffic from customer devices 22 into a composite signal and transmits this signal to a transport node on ring network 10 for delivery to one or more destinations.

As shown in FIG. 3, access node 22B includes interface module 60 for interfacing with links 62 and 64 between transport node 12B and customer device 22B, respectively. Interface module 60 includes ports 66, 68 that couple to transport node 12B and customer device 22B. It should be noted that each access node may be coupled to one or more customer devices 22. Interface module 60 may comprise one or more interface cards (not shown in FIG. 3).

Access node 20B also includes a control unit 70 that couples to interface module 60 and, in particular, ports 66, 68. Control unit 70 may comprise one or more processors 72, such as microprocessors, DSPs, or microcontrollers, that execute software instructions, such as those used to define a software or computer program, stored in a computer-readable storage medium such as memory 74 (e.g., a Flash memory, random access memory (RAM), or any other type of volatile or non-volatile memory that stores instructions), or a storage device (e.g., a disk drive, or an optical drive). Alternatively, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Access node 20B may further store in memory 74 data that represents profile information 80 defining the traffic profile for each VLAN configured on access node 20B. For example, the bandwidth of the VLAN, e.g., expected average bandwidth, may be stored as bandwidth 82. The traffic class of the VLAN, e.g., expedited forwarding, assured forwarding, or best effort, may be stored as traffic class 84. The forwarding behavior of the VLAN, e.g., learning desired or not desired, may be stored as forwarding behavior 86. The preferred ring domain of the VLAN, if specified, may be stored as preferred domain 88.

In one example, after access node 20B has been configured with a traffic profile for a specific VLAN, processor 72 of access node 20B may execute instructions stored in memory 74 that assemble a data unit comprising one or more fields that include the traffic profile information, e.g., bandwidth, traffic class, forwarding behavior, and preferred domain, stored in memory 74. Once the data unit is built, access node 20B may encapsulate the data unit by adding appropriate headers and trailers and transmit the data unit to the transport node, e.g., transport node 12B, from which access node 20B subtends. Transport node 12B may then forward the data unit to control node 16. Upon receiving the data unit transmitted by transport node 12B, control node 16 may decapsulate the packet and store the traffic profile information of access node 20B within memory 44.

Figure 4:
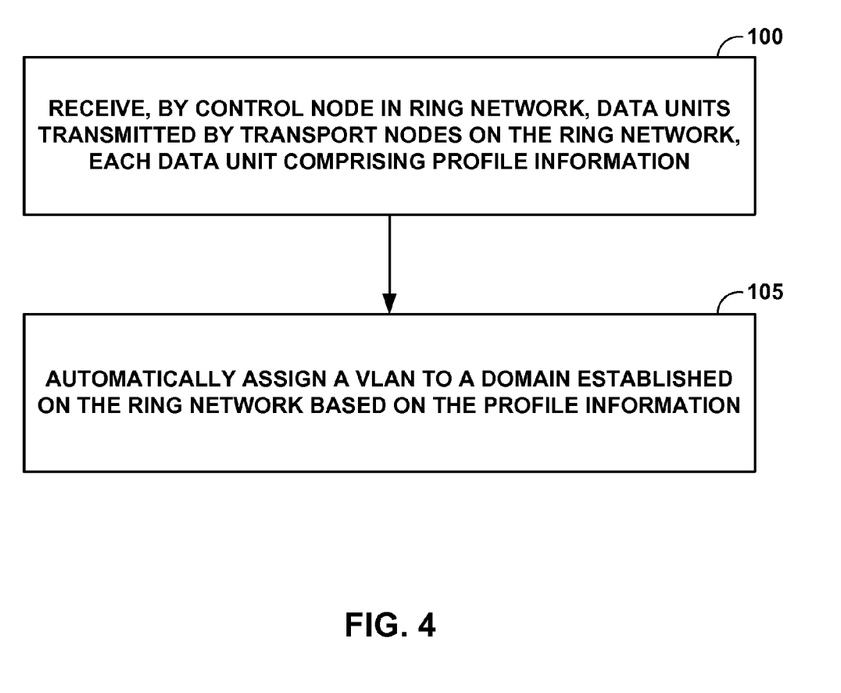
FIG. 4 is a flow diagram illustrating an example method of assigning a VLAN to a domain established on a ring network based on profile information using the techniques described in this disclosure.

FIG. 4 is a flow diagram illustrating an example method of assigning a VLAN to a domain established on a ring network based on profile information. In the method depicted in FIG. 4, control node 16 receives a plurality of data units transmitted by a plurality of transport nodes 12 on ring network 10 (100). Each data unit comprises profile information 52 of a VLAN, such as an expected bandwidth of the VLAN, a traffic class of the VLAN, a forwarding behavior of the VLAN, and a preferred ring domain. Control node 16 automatically assigns, i.e., without manual intervention, the VLAN to one of a plurality of domains 24, 26 established on ring network 10 based on the profile information (105). In one example, control node 16 and transport nodes 12 are layer 2 devices, e.g., layer 2 switches. In another example, the data units are transmitted using a VLAN registration protocol, e.g., GVRP.

In one example, the method further comprises control node 16 determining, via a ring topology protocol, a distance, in number of hops, from each transport node 12 to control node 16. Control node 16 then automatically assigns the VLAN to one of a plurality of domains established on the ring network based on the profile information may comprise comparing the profile information to the distance, in number of hops, from each transport node 12 to control node 16 and assigning the VLAN to one of the plurality of domains 24, 26 established on ring network 10 based on the comparison.

In one example, the profile information comprises a traffic class of the VLAN. Control node 16 assigns the VLAN to one of the plurality of domains 24, 26 established on ring network 10 based on the comparison by optimizing the distance, in number of hops, for the traffic class of the VLAN.

In another example, the profile information comprises an expected bandwidth of the VLAN. Control node 16 assigns the VLAN to one of the plurality of domains 24, 26 established on ring network 10 based on the profile information by comparing the expected bandwidth of the VLAN, e.g., stored in profile information 52 of memory 44, to an available bandwidth of each of the plurality of domains, e.g., stored in domain information 50 of memory 44, established on ring network 10, and optimizing load balancing around ring network 10 based on the comparison.

In some examples, the profile information comprises a preferred ring domain. Control node 16 assigns the VLAN to one of domains 24, 26 established on ring network 10 by assigning the VLAN to the preferred ring domain.

In one example, the profile information comprises an expected bandwidth of the VLAN, a traffic class of the VLAN, and a preferred ring domain of the VLAN. Control node 16 assigns the VLAN to one of a plurality of domains established on the ring network based on the profile information by performing several comparisons. In a first comparison, control node 16 compares the traffic class of the VLAN, e.g., expedited forwarding, assured forwarding, best effort, to the distance, in number of hops, from each transport node 12 to control node 16. In a second comparison, control node 16 compares the expected bandwidth of the VLAN, e.g., 10 Mbps, to an available bandwidth of each of the plurality of domains established on ring network 10. Then, control node 16 assigns the VLAN to one of the plurality of domains established on ring network 10 based on the first comparison, the second comparison, and the preferred ring domain.

In another example, determining, via a ring topology protocol, a distance, in number of hops, from each transport node 12 to control node 16 may comprise several acts. For example, control node 16 may transmit a first control data unit to each of the plurality of transport nodes 12 on ring network 10, wherein each of the plurality of transport nodes comprises an identifier unique to the ring network, e.g., a media access control (MAC) address, a string name, or the like. Each of the plurality of transport nodes 12 on ring network 10 may modify the first control data unit to include the unique identifier of the transport node. Control node 16 may receive the modified first control data unit and determine the distance, in number of hops, from each transport node 12 to the control node based on the modified first control data unit.

In one example, the method further includes control node 16 transmitting, via a VLAN registration protocol, a data unit comprising the assigned domain based on the profile information to at least one of transport nodes 12 on ring network 10.

In some examples, the method depicted in FIG. 4 further comprises control node 16 transmitting a first control data unit comprising information defining the VLAN. Control node 16 then receives a response to the first control data unit from at least one of the plurality of transport nodes 12 indicating that the transport node will join the VLAN. Control node 16 then automatically assigns the VLAN to one of the plurality of domains established on the ring network in response to the control node receiving the response to the first control data unit.

Figure 5:
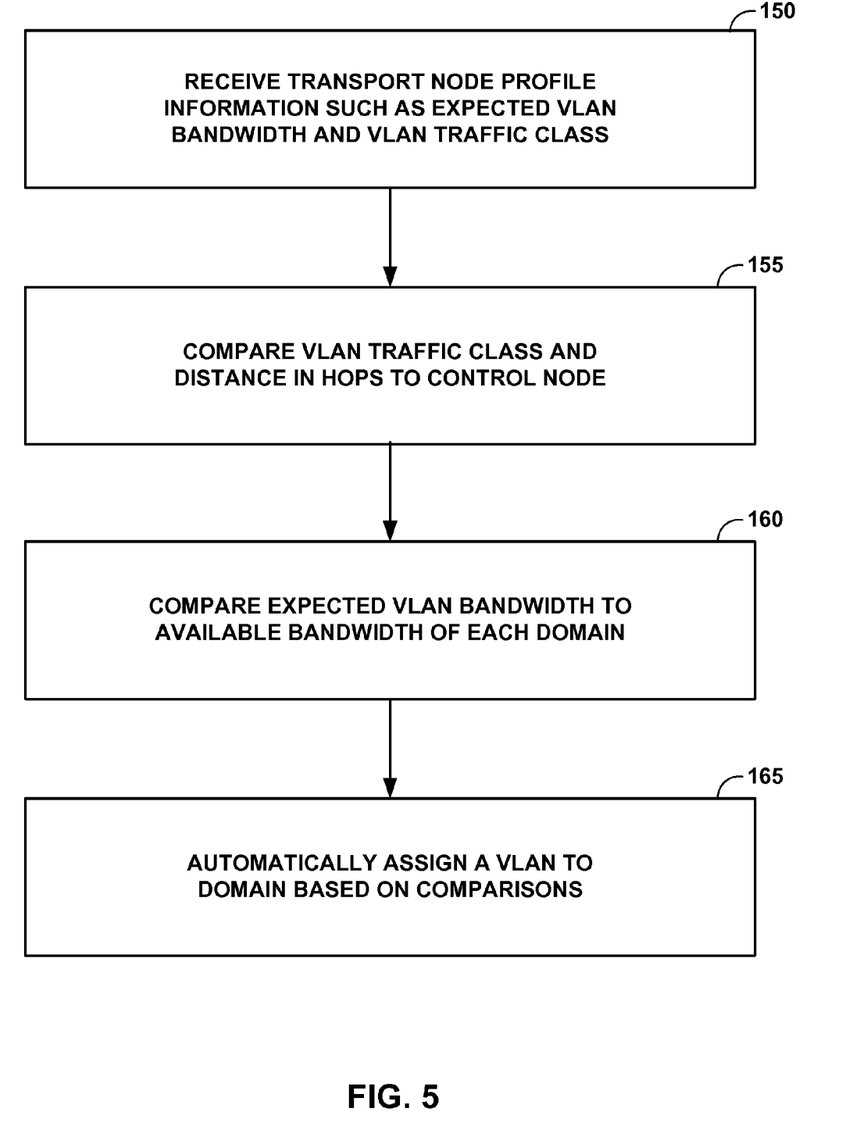
FIG. 5 is a flow diagram illustrating an example method of assigning a VLAN to a domain established on a ring network using multiple heuristics using the techniques described in this disclosure.

FIG. 5 is a flow diagram illustrating an example method of assigning a VLAN to a domain established on a ring network using multiple heuristics, e.g., latency and load balancing. In the method depicted in FIG. 5, control node 16 receives a plurality of data units transmitted by a plurality of transport nodes 12 on ring network 10 (150). Each data unit comprises profile information 52 of a VLAN, such as an expected bandwidth of the VLAN, a traffic class of the VLAN, a forwarding behavior of the VLAN, and a preferred ring domain. Control 52, in a first comparison, compares the VLAN traffic class to the distance, in number of hops, to the control node (155). In order to minimizing latency, it may be desirable to assign the VLAN to the domain with the fewest number of hops, e.g., if the traffic class has the highest priority of expedited forwarding. In a second comparison, control node 52 may compare the expedited bandwidth of the VLAN to the available bandwidth of each domain on the ring network (160). In order to balance the load on the ring, it may be desirable to assign the VLAN to the domain such that the load is approximately balanced between the domains. In some examples, load balancing concerns may take priority over latency, while in other examples, latency concerns may take priority over load balancing. Based on the two comparisons, control node 52 automatically assigns the VLAN to a domain (165).

Figure 6:
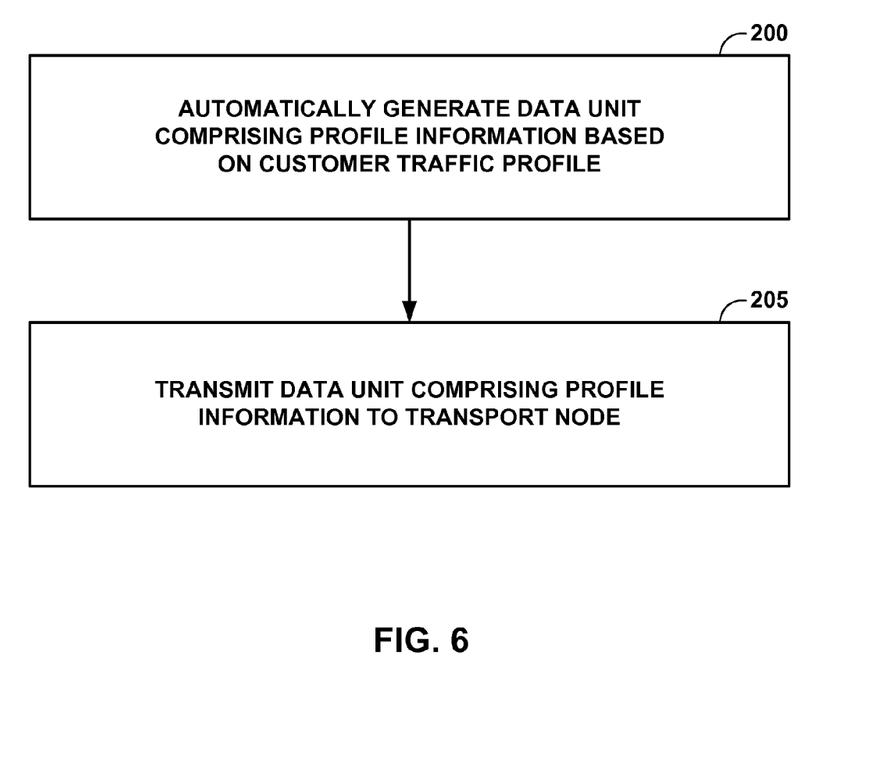
FIG. 6 is a flow diagram illustrating an example method of generating a data unit comprising profile information using the techniques described in this disclosure.

FIG. 6 is a flow diagram illustrating an example method of generating a data unit comprising profile information. In FIG. 6, an access node, e.g., access node 20B, automatically generates a data unit comprising profile information based on a customer traffic profile (200) that was previously stored in memory 74 of access node 20B. Each access node of the ring network is configured with the service profile for each customer, including upload and download speeds (bandwidth requirements), as well as the VLAN to which a customer is associated. Processor 72 of access node 20B may execute instructions stored in memory 74 that assemble a data unit comprising one or more fields that include the traffic profile information, e.g., bandwidth, traffic class, forwarding behavior, and preferred domain, stored in memory 74. Once the data unit is built, access node 20B may encapsulate the data unit by adding appropriate headers and trailers and transmit the data unit to the transport node, e.g., transport node 12B, from which access node 20B subtends (205). Transport node 12B may then forward the data unit to control node 16.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:

1. A method comprising:
receiving, by a control node in a ring network, a plurality of data units transmitted by a plurality of transport nodes on the ring network, each data unit comprising traffic profile information of a virtual local area network (VLAN) that includes at least one of an expected bandwidth of the VLAN, a traffic class of the VLAN, a forwarding behavior of the VLAN, and a preferred ring domain of the VLAN;
automatically assigning, by the control node, the VLAN to one of a plurality of domains established on the ring network based on the traffic profile information of each data unit,
wherein each domain of the plurality of domains comprises a loop-free path of the ring network that the plurality of data units takes in traveling from a first transport node of the plurality of transport nodes to a second transport node of the plurality of transport nodes;
allowing, by the control node, network traffic associated with the VLAN to travel across the one of the plurality of domains; and
blocking, by the control node, network traffic not associated with the VLAN from traveling across the one of the plurality of domains,
wherein the control node is a single node in the ring network configured to both allow network traffic associated with the VLAN to travel across the one of the plurality of domains and also block network traffic not associated with the VLAN from traveling across the one of the plurality of domains.

2. The method of claim 1, further comprising:
determining, via a ring topology protocol and by the control node, a distance, in number of hops, from each of the transport nodes to the control node,
wherein automatically assigning the VLAN to one of a plurality of domains established on the ring network based on the traffic profile information of each data unit comprises:
comparing the traffic profile information to the distance, in number of hops, from each of the transport nodes to the control node; and
automatically assigning the VLAN to one of the plurality of domains established on the ring network based on the comparison.

3. The method of claim 2, wherein determining, via a ring topology protocol, a distance, in number of hops, from each of the transport nodes to the control node comprises:
transmitting, by the control node, a first control data unit to each of the transport nodes on the ring network, wherein each of the transport nodes comprises an identifier;
modifying, by each of the transport nodes on the ring network, the first control data unit to include the identifier of the respective transport node;
receiving, by the control node, the modified first control data unit; and
determining, by the control node, the distance, in number of hops, from each of the transport nodes to the control node based on the modified first control data unit.

4. The method of claim 2, wherein automatically assigning the VLAN to one of the plurality of domains established on the ring network based on the comparison comprises:
automatically assigning the VLAN to the one of the plurality of domains having the fewest number of hops.

5. The method of claim 1, wherein the traffic profile information comprises the expected bandwidth of the VLAN, and wherein automatically assigning the VLAN to one of a plurality of domains established on the ring network based on the traffic profile information of each data unit comprises:
comparing the expected bandwidth of the VLAN to an available bandwidth of each of the plurality of domains established on the ring network; and
automatically assigning the VLAN to the one of the plurality of domains based on load balancing criteria.

6. The method of claim 1, wherein the traffic profile information comprises a preferred ring domain, and wherein automatically assigning the VLAN to one of a plurality of domains established on the ring network based on the traffic profile information of each data unit comprises:
assigning the VLAN to the preferred ring domain.

7. The method of claim 1, wherein the traffic profile information comprises the expected bandwidth of the VLAN, the traffic class of the VLAN, and the preferred ring domain of the VLAN, and wherein automatically assigning the VLAN to one of a plurality of domains established on the ring network based on the traffic profile information of each data unit comprises:
comparing, in a first comparison, the traffic class of the VLAN to a distance, in number of hops, from each transport node to the control node;
comparing, in a second comparison, the expected bandwidth of the VLAN to an available bandwidth of each of the plurality of domains established on the ring network; and
automatically assigning the VLAN to one of the plurality of domains established on the ring network based on the first comparison, the second comparison, and the preferred ring domain.

8. The method of claim 1, further comprising:
transmitting, by the control node, a first control data unit comprising information defining the VLAN;
receiving, by the control node, a response to the first control data unit from at least one of the plurality of transport nodes indicating that the at least one of the plurality of transport nodes will join the VLAN,
wherein automatically assigning the VLAN to one of the plurality of domains established on the ring network based on the traffic profile information of each data unit is in response to the control node receiving the response to the first control data unit.

9. The method of claim 1, further comprising:
automatically generating, by an access node, at least one of the plurality of data units comprising the traffic profile information based on a customer traffic profile; and
transmitting, by the access node, at least one of the plurality of data units comprising the traffic profile information to at least one of the transport nodes.

10. The method of claim 1, wherein each of the control node and the plurality of transport nodes are layer two networking devices.

11. The method of claim 1, wherein the data units are transmitted using a VLAN registration protocol.

12. The method of claim 1, further comprising transmitting, via a VLAN registration protocol, by the control node in the ring network, a data unit comprising the assigned domain to at least one of the transport nodes on the ring network.

13. The method of claim 1, wherein automatically assigning the VLAN to one of a plurality of domains established on the ring network based on the traffic profile information of each data unit comprises:

automatically assigning the VLAN to one of a plurality of domains established on the ring network based on the traffic profile information of each data unit without manual intervention.

14. The method of claim 1, wherein each domain of the plurality of domains established on the ring network comprises a loop free path that traffic may take from an originating point on the ring network to a terminating point on the ring network.

15. A network device comprising a processor configured to:
receive a plurality of data units transmitted by a plurality of transport nodes on the ring network, each data unit comprising traffic profile information of a virtual local area network (VLAN) that includes at least one of an expected bandwidth of the VLAN, a traffic class of the VLAN, forwarding behavior of the VLAN, and a preferred ring domain of the VLAN;
automatically assign the VLAN to one of a plurality of domains established on the ring network based on the traffic profile information of each data unit, wherein each domain of the plurality of domains comprises a loop-free path of the ring network that the plurality of data units takes in traveling from a first transport node of the plurality of transport nodes to a second transport node of the plurality of transport nodes;
allow network traffic associated with the VLAN to travel across the one of the plurality of domains; and
block network traffic not associated with the VLAN from traveling across the one of the plurality of domains, wherein the network device is a single network device on the ring network for both allowing traffic associated with the VLAN to travel across the one of the plurality of domains and also blocking network traffic not associated with the VLAN from traveling across the one of the plurality of domains.

16. The network device of claim 15, wherein the processor is further configured to:
determine, via a ring topology protocol and by the network device, a distance, in number of hops, from each of the transport nodes to the network device,
wherein the processor configured to automatically assign the VLAN to one of a plurality of domains established on the ring network based on the traffic profile information of each data unit is configured to:
compare the traffic profile information to the distance, in number of hops, from each of the transport nodes to the network device; and
automatically assign the VLAN to one of the plurality of domains established on the ring network based on the comparison.

17. The network device of claim 16, wherein the processor configured to determine, via a ring topology protocol, a distance, in number of hops, from each of the transport nodes to the network device is further configured to:
transmit, a first control data unit to each of the transport nodes on the ring network, wherein each of the transport nodes comprises an identifier, and wherein each of the transport nodes on the ring network modify the first control data unit to include the identifier of the respective transport node;
receive the modified first control data unit; and
determine the distance, in number of hops, from each of the transport nodes to the network device based on the modified first control data unit.

18. The network device of claim 16, wherein the processor configured to automatically assign the VLAN to one of the plurality of domains established on the ring network based on the comparison is configured to:
automatically assign the VLAN to the one of the plurality of domains having the fewest number of hops.

19. The network device of claim 15, wherein the traffic profile information comprises the expected bandwidth of the VLAN, and wherein the processor configured to automatically assign the VLAN to one of a plurality of domains established on the ring network based on the traffic profile information of each data unit is configured to:
compare the expected bandwidth of the VLAN to an available bandwidth of each of the plurality of domains established on the ring network; and
automatically assign the VLAN to the one of the plurality of domains based on load balancing criteria.

20. The network device of claim 15, wherein the traffic profile information of each data unit comprises the preferred ring domain, and wherein the processor configured to automatically assign the VLAN to one of a plurality of domains established on the ring network is configured to:
automatically assign the VLAN to the preferred ring domain.

21. The network device of claim 15, wherein the traffic profile information of each data unit comprises the expected bandwidth of the VLAN, the traffic class of the VLAN, and the preferred ring domain of the VLAN, and wherein the processor configured to automatically assign a VLAN to one of a plurality of domains established on the ring network based on the traffic profile information of each data unit is configured to:
compare, in a first comparison, the traffic class of the VLAN to a distance, in number of hops, from each transport node to the network device;
compare, in a second comparison, the expected bandwidth of the VLAN to an available bandwidth of each of the plurality of domains established on the ring network; and
automatically assign the VLAN to one of the plurality of domains established on the ring network based on the first comparison, the second comparison, and the preferred ring domain.

22. The network device of claim 15, wherein the processor is further configured to:
transmit a first control data unit comprising information defining the VLAN;
receive a response to the first control data unit from at least one of the plurality of transport nodes indicating that the at least one of the plurality of transport nodes will join the VLAN,
wherein automatically assigning the VLAN to one of the plurality of domains established on the ring network based on the traffic profile information of each data unit is in response to the processor receiving the response to the first control data unit.

23. The network device of claim 15, wherein the network device is a layer two networking device.

24. The network device of claim 15, wherein the data units are transmitted using a VLAN registration protocol.

25. The network device of claim 15, wherein the processor is further configured to:
transmit, via a VLAN registration protocol, a data unit comprising the assigned domain to at least one of the transport nodes on the ring network.

26. A non-transitory computer-readable medium comprising instructions encoded on the non-transitory computer-readable medium that, upon execution, cause a processor within a network device to:

receive a plurality of data units transmitted by a plurality of transport nodes on the ring network, each data unit comprising traffic profile information of a virtual local area network (VLAN) that includes at least one of an expected bandwidth of the VLAN, a traffic class of the VLAN, forwarding behavior of the VLAN, and a preferred ring domain of the VLAN;

automatically assign the VLAN to one of a plurality of domains established on the ring network based on the traffic profile information of each data unit, wherein each domain of the plurality of domains comprises a loop-free path of the ring network that the plurality of data units takes in traveling from a first transport node of the plurality of transport nodes to a second transport node of the plurality of transport nodes;

allow network traffic associated with the VLAN to travel across the one of the plurality of domains; and block network traffic not associated with the VLAN from traveling across the one of the plurality of domains, wherein the network device is a single network device on the ring network for both allowing traffic associated with the VLAN to travel across the one of the plurality of domains and also blocking network traffic not associated with the VLAN from traveling across the one of the plurality of domains.

27. The non-transitory computer-readable medium of claim 26, further comprising instructions encoded on the non-transitory computer-readable medium that, upon execution, cause a processor within a network device to:

determine, via a ring topology protocol, a distance, in number of hops, from each of the transport nodes to the network device, wherein the instructions that cause a processor to automatically assign the VLAN to one of a plurality of domains established on the ring network based on the traffic profile information of each data unit further comprise instructions that cause a processor to:

compare the traffic profile information of each data unit to the distance, in number of hops, from each of the transport nodes to the network device; and automatically assign the VLAN to one of the plurality of domains established on the ring network based on the comparison.

28. The non-transitory computer-readable medium of claim 27, wherein the instructions that cause a processor to determine, via a ring topology protocol, a distance, in number of hops, from each of the transport nodes to the network device further comprise instructions that cause a processor to:

transmit, a first control data unit to each of the transport nodes on the ring network, wherein each of the transport nodes comprises an identifier, and wherein each of the transport nodes on the ring network modify the first control data unit to include the identifier of the respective transport node;

receive, the modified first control data unit; and determine the distance, in number of hops, from each of the transport nodes to the network device based on the modified first control data unit.

29. The non-transitory computer-readable medium of claim 27, wherein the instructions that cause a processor to automatically assign the VLAN to one of the plurality of domains established on the ring network based on the comparison further comprise instructions that cause a processor to:

automatically assign the VLAN to the one of the plurality of domains having the fewest number of hops.

30. The non-transitory computer-readable medium of claim 26, wherein the traffic profile information comprises the expected bandwidth of the VLAN, and wherein the instructions that cause a processor to automatically assign the VLAN to one of a plurality of domains established on the ring network based on the traffic profile information of each data unit further comprise instructions that cause a processor to:

compare the expected bandwidth of the VLAN to an available bandwidth of each of the plurality of domains established on the ring network; and automatically assign the VLAN to the one of the plurality of domains based on load balancing criteria.

31. The non-transitory computer-readable medium of claim 26, wherein the traffic profile information comprises a preferred ring domain, and wherein automatically assigning the VLAN to one of a plurality of domains established on the ring network based on the traffic profile information of each data unit comprises:

automatically assigning the VLAN to the preferred ring domain.

32. The non-transitory computer-readable medium of claim 26, wherein the traffic profile information comprises the expected bandwidth of the VLAN, the traffic class of the VLAN, and the preferred ring domain of the VLAN, and wherein the instructions that cause a processor to automatically assign the VLAN to one of a plurality of domains established on the ring network based on the traffic profile information of each data unit further comprise instructions that cause a processor to:

compare, in a first comparison, the traffic class of the VLAN to a distance, in number of hops, from each transport node to the control node;

compare, in a second comparison, the expected bandwidth of the VLAN to an available bandwidth of each of the plurality of domains established on the ring network; and automatically assign the VLAN to one of the plurality of domains established on the ring network based on the first comparison, the second comparison, and the preferred ring domain.

33. The non-transitory computer-readable medium of claim 26, further comprising instructions that cause a processor to:

transmit a first control data unit comprising information defining the VLAN;

receive a response to the first control data unit from at least one of the plurality of transport nodes indicating that the at least one of the plurality of transport nodes will join the VLAN, wherein the instruction that causes a processor to automatically assign the VLAN to one of the plurality of domains established on the ring network based on the traffic profile information of each data unit is in response to the control node receiving the response to the first control data unit.

34. The non-transitory computer-readable medium of claim 26, wherein the network device is layer two networking device.

35. The non-transitory computer-readable medium of claim 26, wherein the data units are transmitted using a VLAN registration protocol.

36. The non-transitory computer-readable medium of claim 26, further comprising instructions that cause a processor to:

transmit, via a VLAN registration protocol, by the control node in the ring network, a data unit comprising the assigned domain to at least one of the transport nodes on the ring network.

37. A network device comprising:
means for receiving, by a control node in a ring network, a plurality of data units transmitted by a plurality of transport nodes on the ring network, each data unit comprising traffic profile information of a virtual local area network (VLAN) that includes at least one of an expected bandwidth of the VLAN, a traffic class of the VLAN, forwarding behavior of the VLAN, and a preferred ring domain of the VLAN;
means for automatically assigning the VLAN to one of a plurality of domains established on the ring network based on the traffic profile information of each data unit, wherein each domain of the plurality of domains comprises a loop-free path of the ring network that the plurality of data units takes in traveling from a first transport node of the plurality of transport nodes to a second transport node of the plurality of transport nodes;
means for allowing network traffic associated with the VLAN to travel across the one of the plurality of domains; and
means for blocking network traffic not associated with the VLAN from traveling across the one of the plurality of domains, wherein the network device is a single network device on the ring network for both allowing traffic associated with the VLAN to travel across the one of the plurality of domains and also blocking network traffic not associated with the VLAN from traveling across the one of the plurality of domains.

38. The network device of claim 37, further comprising:
means for receiving a plurality of data units transmitted by a plurality of transport nodes on the ring network, each data unit comprising traffic profile information of a virtual local area network (VLAN) that includes at least one of an expected bandwidth of the VLAN, a traffic class of the VLAN, forwarding behavior of the VLAN, and a preferred ring domain of the VLAN; and
means for automatically assigning the VLAN to one of a plurality of domains established on the ring network based on the traffic profile information of each data unit.

39. The network device of claim 38, further comprising:
means for determining, via a ring topology protocol, a distance, in number of hops, from each of the transport nodes to the control node,
wherein the means for automatically assigning the VLAN to one of a plurality of domains established on the ring network based on the traffic profile information of each data unit comprises:
means for comparing the traffic profile information of each data unit to the distance, in number of hops, from each of the transport nodes to the control node; and
means for automatically assigning the VLAN to one of the plurality of domains established on the ring network based on the comparison.

40. The network device of claim 39, further comprising:
means for transmitting a first control data unit to each of the transport nodes on the ring network, wherein each of the transport nodes comprises an identifier, and wherein each of the transport nodes on the ring network modify the first control data unit to include the identifier of the respective transport node;
means for receiving the modified first control data unit; and
means for determining the distance, in number of hops, from each of the transport nodes to the network device based on the modified first control data unit.

41. The network device of claim 39, further comprising:
means for automatically assigning the VLAN to the one of the plurality of domains having the fewest number of hops.

42. The network device of claim 38, wherein the traffic profile information of each data unit comprises the expected bandwidth of the VLAN, the network device further comprising:
means for comparing the expected bandwidth of the VLAN to an available bandwidth of each of the plurality of domains established on the ring network; and
means for automatically assigning the VLAN to the one of the plurality of domains based on load balancing criteria.

43. The network device of claim 38, wherein the traffic profile information of each data unit comprises the preferred ring domain, the network device further comprising:
means for automatically assigning the VLAN to the preferred ring domain.

44. The network device of claim 38, wherein the traffic profile information of each data unit comprises the expected bandwidth of the VLAN, the traffic class of the VLAN, and the preferred ring domain of the VLAN, to the network device further comprising:
means for comparing, in a first comparison, the traffic class of the VLAN to a distance, in number of hops, from each transport node to the control node;
means for comparing, in a second comparison, the expected bandwidth of the VLAN to an available bandwidth of each of the plurality of domains established on the ring network; and
means for automatically assigning the VLAN to one of the plurality of domains established on the ring network based on the first comparison, the second comparison, and the preferred ring domain.

45. The network device of claim 38, further comprising:
means for transmitting a first control data unit comprising information defining the VLAN;
means for receiving a response to the first control data unit from at least one of the plurality of transport nodes indicating that the at least one of the plurality of transport nodes will join the VLAN,
wherein the means for automatically assigning the VLAN to one of the plurality of domains established on the ring network based on the traffic profile information of each data unit is in response to the receiving the response to the first control data unit.

46. The network device of claim 38, wherein the network device is a layer two networking device.

47. The network device of claim 38, wherein the data units are transmitted using a VLAN registration protocol.

48. The network device of claim 38, further comprising:
means for transmitting, via a VLAN registration protocol, a data unit comprising the assigned domain to at least one of the transport nodes on the ring network.

* * * * *

UNITED STATES PATENT AND TRADEMARK OFFICE
CERTIFICATE OF CORRECTION

PATENT NO.       : 8,526,443 B2                                        Page 1 of 1
APPLICATION NO.  : 12/575014
DATED            : September 3, 2013
INVENTOR(S)      : Baykal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twenty-third Day of May, 2017

Michelle K. Lee
*Director of the United States Patent and Trademark Office*